No. 858,238. PATENTED JUNE 25, 1907.
F. G. WEBER.
TROLLEY FINDER.
APPLICATION FILED FEB. 19, 1907.

Witnesses
R. C. Claflin
H. S. Elmore

Inventor
Frederick George Weber

By Victor J. Evans
Attorney

UNITED STATES PATENT OFFICE.

FREDERICK GEORGE WEBER, OF ASHLAND, KENTUCKY.

TROLLEY-FINDER.

No. 858,238.　　　Specification of Letters Patent.　　　Patented June 25, 1907.

Application filed February 19, 1907. Serial No. 358,182.

*To all whom it may concern:*

Be it known that I, FREDERICK GEORGE WEBER, a citizen of the United States, residing at Ashland, in the county of Boyd and State of Kentucky, have invented new and useful Improvements in Trolley-Finders, of which the following is a specification.

This invention relates to trolley finders, and has for its objects to provide a comparatively simple, inexpensive device of this character whereby the trolley may, in the event of leaving the wire, be readily replaced on the latter, and one which in practice will normally stand in an unobstructing position and may be conveniently manipulated when circumstances require.

With these and other objects in view, the invention comprises the novel features of construction and combination of parts hereinafter more fully described.

Figure 1:
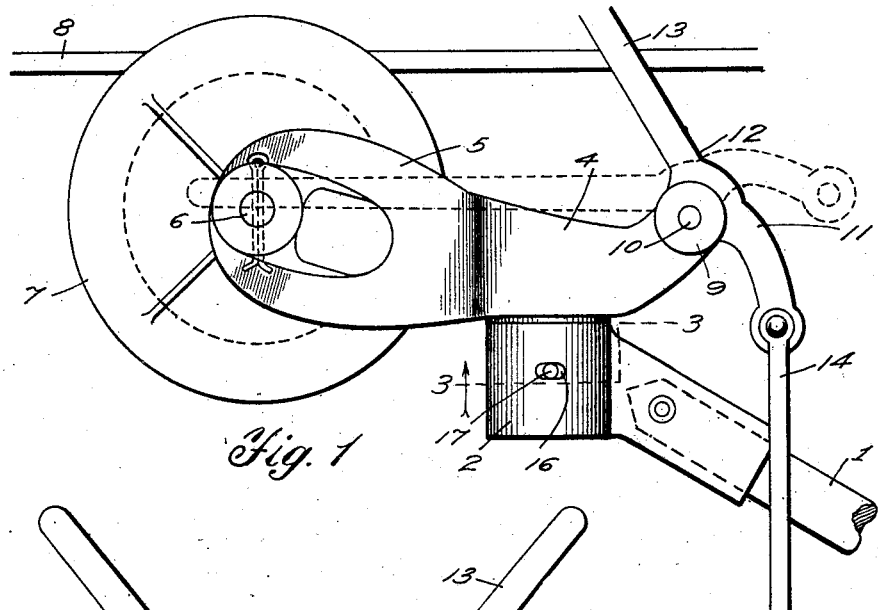
Figure 2:
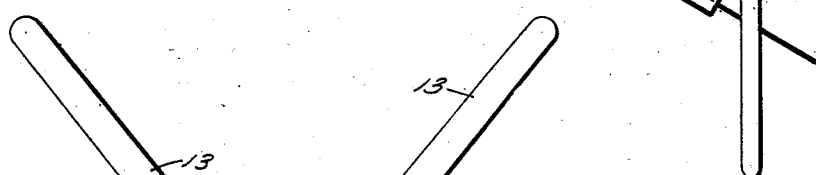
Figure 3:
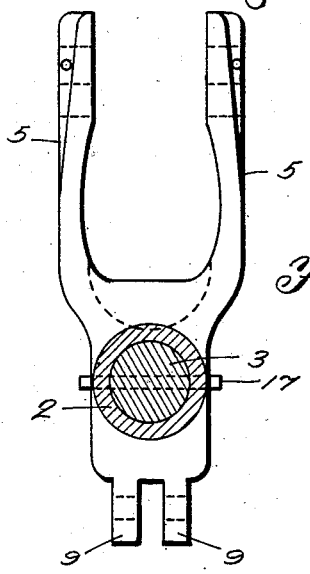

In the accompanying drawings, Figure 1 is a side elevation of a trolley equipped with a finder embodying the invention. Fig. 2 is a front elevation of the same. Fig. 3 is a reverse plan view partly in section, the section being taken on the line 3—3 of Fig. 1.

Referring to the drawings, 1 designates a trolley pole having fixed upon its upper end a vertical tubular bearing 2, in which is journaled the cylindrical bearing portion or spindle 3 of a head 4 provided with a pair of spaced rearwardly extending side portions or jaws 5 between which there is journaled by means of a pintle 6, a grooved trolley wheel 7, adapted to travel, as usual, on an overhead wire 8.

Provided at the forward end of the head 5 is a pair of spaced bearing ears 9 perforated to receive a horizontal pintle 10 on which is fulcrumed the shank portion 11 of a substantially Y-shaped trolley finding member or fork 12 presenting a pair of divergent portions or arms 13 which, when the finder is moved to active position, project upwardly and outwardly at opposite sides of the wire 8, there being pivoted to the forward or lower end of the shank 11, an elongated open link 14 through which the pole 1 extends and to which there is attached a rope or other flexible connection 15 for operating the finder.

Formed in the side walls of the bearing 2 is a pair of opposed horizontal slots 16, while extended transversely through the spindle 3 is a connecting pin 17 adapted to play in said slots for permitting limited rotation of the spindle within the bearing to compensate for relative lateral movement of the wheel 7 and wire 8, said pin serving also to secure the spindle within the bearing sleeve.

In practice, the finder 12 normally lies in horizontal unobstructing position, as illustrated by dotted lines in Fig. 1—this is owing to the fact that the forked end of the finder is heavier than the shank portion 11 thereof. When, however, the wheel 7 escapes from the wire, downward traction is exerted on the rope 15, thereby swinging the finder upward to the full line position shown in Figs. 1 and 2, whereby the arms 13 will project at opposite sides of the wire, thereby permitting ready engagement of the device with the latter for replacing the wheel on the wire, as will be readily understood.

Having thus described the invention, what I claim is:

1. In a device of the class described, a pole, a head attached to the upper end thereof and provided with rearwardly extending spaced side portions, a trolley wheel journaled between said side portions, a substantially Y-shaped trolley-finding member pivoted to the forward end of the head and having one end heavier than the other to cause said finder to normally lie in a horizontal position, and means for moving the finder to active position for engagement with the wire.

2. In a device of the class described, a pole, a vertical tubular bearing sleeve attached to the upper end of the pole, a head having a bearing spindle swiveled in said sleeve, a trolley wheel journaled on the head and adapted for engagement with a trolley wire, a trolley finder pivoted to the head at a point in advance of the wheel and having a pair of divergent arms adapted to engage at opposite sides of the wire, and means for moving the finder to wire-engaging position.

In testimony whereof, I affix my signature in presence of two witnesses.

FREDERICK GEORGE WEBER.

Witnesses:
　JOHN G. FEARING,
　LEONARD H. KRAMER.